US007650484B2

(12) United States Patent
Inuo et al.

(10) Patent No.: US 7,650,484 B2
(45) Date of Patent: Jan. 19, 2010

(54) ARRAY—TYPE COMPUTER PROCESSOR WITH REDUCED INSTRUCTION STORAGE

(75) Inventors: Takeshi Inuo, Tokyo (JP); Nobuki Kajihara, Tokyo (JP); Takao Toi, Tokyo (JP); Tooru Awashima, Tokyo (JP); Hirokazu Kami, Tokyo (JP); Taro Fujii, Kanagawa (JP); Kenichiro Anjo, Kanagawa (JP); Kouichiro Furuta, Kanagawa (JP); Masato Motomura, Kanagawa (JP)

(73) Assignees: NEC Corporation, Tokyo (JP); NEC Electronics Corporation, Kanagawa (JP)

( * ) Notice: Subject to any disclaimer, the term of this patent is extended or adjusted under 35 U.S.C. 154(b) by 295 days.

(21) Appl. No.: 11/049,305

(22) Filed: Feb. 3, 2005

(65) Prior Publication Data

US 2005/0172103 A1     Aug. 4, 2005

(30) Foreign Application Priority Data

Feb. 3, 2004     (JP)     ............................. 2004-026800

(51) Int. Cl.
*G06F 7/00*     (2006.01)
(52) U.S. Cl. ............................. 712/16; 712/10; 712/18; 712/220; 712/245
(58) Field of Classification Search .................. 712/16, 712/10, 18, 220, 245
See application file for complete search history.

(56) References Cited

U.S. PATENT DOCUMENTS 3,287,703 A * 11/1966 Slotnick ...................... 712/13

(Continued)

FOREIGN PATENT DOCUMENTS

JP     60-39248     3/1985

(Continued)

OTHER PUBLICATIONS

Fiske, S. and Dally, W. J. 1995. Thread prioritization: a thread scheduling mechanism for multiple-context parallel processors. In Proceedings of the 1st IEEE Symposium on High-Performance Computer Architecture (Jan. 22-25, 1995). HPCA. IEEE Computer Society, Washington, DC, 222.*

(Continued)

*Primary Examiner*—Eddie P Chan
*Assistant Examiner*—William B Partridge
(74) *Attorney, Agent, or Firm*—Whitham, Curtis, Christofferson & Cook, P.C.

(57) ABSTRACT

An array-type computer processor including a data path unit communicating with a state control unit obtains data of a predetermined number of cooperative partial instruction codes, and operates with temporarily holding only a predetermined number of data-obtained instruction codes comprising cooperative partial instruction codes corresponding to contexts and operation states for the data path unit and the state control unit, respectively, from an external program memory which stores data of a computer program. Every time the operations with the temporarily-held instruction codes, including the corresponding cooperative partial instruction codes, are complete, in accordance with event data entered in the state control unit, the subsequent instruction codes are data obtained as cooperative partial instruction codes respectively corresponding to contexts and operating states, so that the operation according to a computer program can be performed even if the data volume of the computer program is over the storage capacity of the data path unit and the state control unit.

19 Claims, 7 Drawing Sheets

U.S. PATENT DOCUMENTS

| | | | | | |
|---|---|---|---|---|---|
| 4,943,912 | A | * | 7/1990 | Aoyama et al. | 712/16 |
| 5,559,973 | A | * | 9/1996 | Gallup et al. | 712/241 |
| 6,697,935 | B1 | * | 2/2004 | Borkenhagen et al. | 712/228 |
| 7,051,329 | B1 | * | 5/2006 | Boggs et al. | 718/104 |

FOREIGN PATENT DOCUMENTS

| | | |
|---|---|---|
| JP | 62-86439 | 4/1987 |
| JP | 10-240549 | 9/1998 |
| JP | 2000-124317 | 4/2000 |
| JP | 2000-138579 | 5/2000 |
| JP | 2000-224025 | 8/2000 |
| JP | 2000-232162 | 8/2000 |
| JP | 2000-232354 | 8/2000 |
| JP | 2003-076668 | 3/2003 |
| JP | 2003-099409 | 4/2003 |
| JP | 2003-196246 | 7/2003 |
| JP | 2003-196248 | 7/2003 |

OTHER PUBLICATIONS

Snyder, Lawrence, "Introduction to the Configurable, Highly Parallel Computer", IEEE, pp. 47-56 (Jan. 1992).

The Office Action issued by the Japanese Patent Office on Dec. 5, 2007, with English language translation, pp. 1 to 4.

The Office Action issued by the Japanese Patent Office on Sep. 24, 2008, with an English language translation in regard of the related Japanese application, pp. 1 to 4.

* cited by examiner

ARRAY—TYPE COMPUTER PROCESSOR WITH REDUCED INSTRUCTION STORAGE

BACKGROUND OF THE INVENTION

1. Field of the Invention

The present invention relates to an array-type computer processor including a state control unit and a data-path unit that includes a plurality of processor elements and a plurality of switch elements, which are arranged in a matrix.

2. Description of the Related Art

Current processor units that can perform various data processes include the products that are referred to as the so-called CPU (Central Processing Unit) and MPU (Micro Processor Unit). The data-processing system using such a processor unit includes a memory device and stores various object codes, in which a plurality of operation instructions are described as well as the various processed data. The processor unit can perform a data read in order of the operation instructions and also perform a data read of processed data from a memory device to serially perform a plurality of data processing operations.

A single processor unit can thus perform various data processes. The data processes, however, need to be performed serially in order of the plurality of the operation instructions, and for each of the serial data processes, the processor unit needs to perform a data read of the operation instructions from the memory device, thereby making it hard to perform complicated data processes at high speed.

On the other hand, if only one data process is to be performed, logical circuits may be formed in hardware for performing the data process, without the necessity of the processor unit data reading, in order, the plurality of operation instructions from the memory device to perform the plurality of data processes serially in order. The complicated data processes can thus be performed at high speed, but, of course, only performing one data process in a given logical circuit.

That is, the data-processing system that can switch between any object codes can perform various data processes, but not at high speed as can be achieved by a fixed hardware configuration. On the other hand, the logical circuits in hardware can perform the data processes at high speed, but only one data process due to the fixed object code embodied in the hardware configuration.

To solve the above-described problems, the applicants invented an array-type computer processor as the processor unit that can change the hardware configuration according to software. This array-type computer processor includes a number of small-scale processor elements and switch elements arranged in a matrix, and a data-path unit and state control unit provided in parallel therewith.

Each of the plurality of processor elements can perform a data process individually according to each operation instruction that is individually data set (e.g. set in accordance with the data of the operation instruction). Each of the plurality of switch elements can control each of the connections between the plurality of processor elements according to each operation instruction that is individually data set. The array-type computer processor can thus switch the operation instructions of the plurality of processor elements and the plurality of switch elements to change the hardware configuration to perform the various data processes.

A number of small-scale processor elements as hardware can perform simple data processes in parallel so as to perform complicated data processes at high speed as a whole. For each operation cycle, the state control unit sequentially switches, according to the object code, the context of the operation instructions for the plurality of processor elements and the plurality of switch elements as described above, so that the array-type computer processor can continuously perform the parallel processes according to the object code (see, for example, Japanese Patent No. 3269526, Japanese application patent laid-open publication No. 2000-138579, Japanese application patent laid-open publication No. 2000-224025, Japanese application patent laid-open publication No. 2000-232354, Japanese application patent laid-open publication No. 2000-232162, Japanese application patent laid-open publication No. 2003-076668, Japanese application patent laid-open publication No. 2003-099409, and "Introduction to the Configurable, Highly Parallel Computer", Lawrence Snyder, Purdue University, "IEEE Computer, vol. 15, No. 1, January 1982, pp 47-56").

A data-processing system is also in practical use that includes the plurality of data-processing devices connected in parallel for sharing complicated data processes. Such a data-processing system may be of a homogeneity-connected type data processing system with the plurality of data-processing devices of the same structure connected, or a heterogeneity-connected type data processing system with the plurality of data-processing devices of different structures connected.

The homogeneity-connected type of the data-processing system shares one data process in the plurality of data-processing devices of the same structure, thereby allowing for the data process to be performed with high parallelism. The heterogeneity-connected type of the data-processing system shares one data process among the plurality of data-processing devices of different types, thereby allowing each data-processing device to perform its special data process. The applicants proposed the heterogeneity-connected type of the data-processing system as described above which includes the combination of the general MPU and the array-type computer processor (see, for example, Japanese application patent laid-open publication 2003-196248).

The array-type computer processor as described above can actually be used after storing data of a computer program of the object code in a program memory, and connecting the program memory to the array-type computer processor via a system bus and the like. The array-type computer processor then obtains and holds data of the computer program from the external program memory and operates according to the data-held (e.g. stored) computer program.

The array-type computer processor can data store the computer program in a limited storage capacity, however, the user of the array-type computer processor can create any kind of computer programs, so that the data volume of the computer program can exceed the storage capacity of the array-type computer processor. To prevent this, it may be ensured that the array-type computer processor has enough storage capacity. This may, however, enlarge the circuit scale of the array-type computer processor which may increase the circuit size and manufacturing cost. Thus, a small volume computer program may waste the storage capacity of such an enlarged array-type computer processor.

SUMMARY OF THE INVENTION

The present invention was accomplished in light of the above-described problems, and aims to provide an array-type computer processor which can perform the operation according to a computer program even if the data volume of the computer program exceeds the storage capacity.

The array-type computer processor according to the present invention includes a data-path unit, a state control unit, and a code-obtaining means. The data-path unit comprises a plurality of processor elements and a plurality of switch elements, which are arranged in a matrix. A plurality of the processor elements perform each of the data processes according to an instruction code in which data are described in a computer program for each of the plurality of operation states that are sequentially transferred. A plurality of the switch elements can control the connections between the plurality of the processor elements according to the instruction ode. The state control unit sequentially transfers, for each operation state, the contexts of the instruction code for each operation state of the data-path unit, according to the instruction codes and properly inputted event data.

Note, however, that the code-obtaining means which obtains data from the external program memory that stores data of the computer program, obtains a predetermined number of cooperative partial instruction codes of the operation states along with the corresponding partial instruction codes of the contexts, so that the state control unit operates with temporarily holding only a predetermined number of the (partial) instruction codes of the operation states and the data-path unit operates with temporarily holding only a predetermined number of the (partial) instruction codes of the contexts. Every time the state control unit and data-path unit complete their operations with the temporarily-held instruction codes, the code-obtaining means obtains data of the instruction codes of the subsequent operation states and contexts, so that the array-type computer processor can perform the operations according to the computer program, even if the data volume of the computer program exceeds the storage capacity.

The various means referred to in the present invention may be any means that is provided to realize its function, such as dedicated hardware for providing a predetermined function, a data-processing device being configured to perform a predetermined function by a computer program, a predetermined function provided in a data-processing device by a computer program, and/or a combination thereof.

The various means referred to in the present invention may not necessarily be individually independent. A plurality of means may be formed as one member, one means may form a part of any other means, a part of one means may overlap with a part of any other means, and the like.

The data-processing device referred to in the present invention may be any hardware that can data read a computer program to perform a corresponding data process, such as hardware including MPU as a main element thereof to which are connected various devices such as ROM, RAM (Random Access Memory), and an I/F (Interface) unit.

The event data referred to in the present invention may be the data by which the state control unit and data-path unit and the like communicate various information to each other to perform various operations. The event data includes, for example, a predetermined code by which the data-path unit informs the state control unit of the operation state being transferred to the next stage, a predetermined code by which the state control unit informs the code-obtaining means of the initial condition or the current operation state or the impossibility of continuation of the operation transfers and a predetermined code by which the code-obtaining means informs the state control unit of starting an operation.

The array-type computer processor according to the present invention can perform an operation according to the computer program, even if the data volume of the computer program exceeds the storage capacity of the array-type computer processor, so that the array-type computer processor can adapt to various volumes of various computer programs without increasing the circuit scale uselessly.

The above and other objects, features, and advantages of the present invention will become apparent from the following description with reference to the accompanying drawings, which illustrate examples of the present invention.

DETAILED DESCRIPTION OF THE PREFERRED EMBODIMENTS

Figure 1:
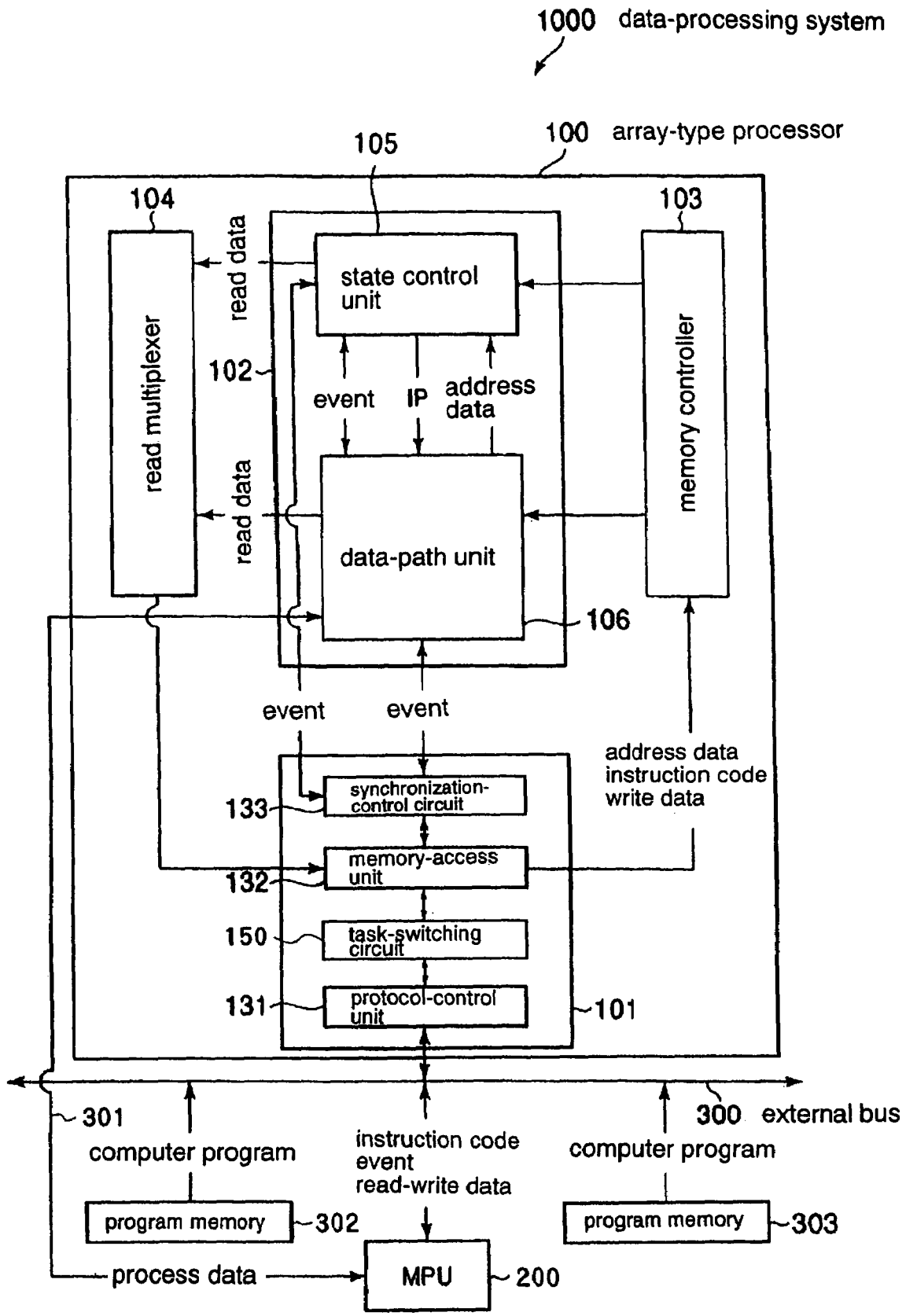
FIG. 1 is a block diagram of a circuit structure of a data-processing system according to an embodiment of the present invention.

One embodiment according to the present invention will be described below with reference to drawings. Data-processing system 1000 in this embodiment includes, as shown in FIG. 1, a plurality of data-processing devices of one array-type computer processor 100 and one MPU 200. The array-type computer processor 100 and the MPU 200 are connected to each other via external bus 300 and data line 301. Data-processing system 1000 also includes program memory 302 dedicated for storing a computer program of array-type computer processor 100, and program memory 303 dedicated for storing computer program of MPU 200. These memories connect to external bus 300.

Array-type computer processor 100 data reads its own computer program from program memory 302 and performs a data process according to the computer program. At the same time, data-path unit 106 processes the inputted processed data and outputs it. Data-path unit 106 generates event data according to the data process.

MPU 200 includes hardware such as I/F circuit, processor core, and internal register (not shown), and operates according to the computer program stored in program memory 303 to logically form various means in accordance with various functions specified in the computer program, such as data-input means, data-processing means, data-storage means, and data-output means. The data-input means corresponds to a function where the processor core recognizes the input data of the I/F circuit according to the computer program. The data-input means can input the processed data and event data. The data-processing means corresponds to a function where the processor core performs data processes. The data-processing means can process the inputted (previously) processed data according to the computer program and event data. The data-storage means corresponds to a function where the processor core stores the processed data into the internal register. The data-storage means temporarily stores various data such as processed data. The data-output means corresponds to a function where the processor core controls the data output of I/F circuit. The data-output means outputs the processed data and event data.

Note, however, that MPU 200 in data-processing system 1000 receives the event data and at least part of the processed data from array-type computer processor 100, and generates a new event data according to at least part of the processed data, and outputs at least part of the processed data and the newly generated event data to array-type computer processor 100.

Array-type computer processor 100 includes I/F circuit 101, processor core 102, memory controller 103 as a generation circuit and a virtual-recognition means, read multiplexer 104 as a data-read circuit, and the like. Processor core 102 includes, as shown in FIG. 1 and FIG. 3, state control unit 105 and data-path unit 106.

Figure 2A:
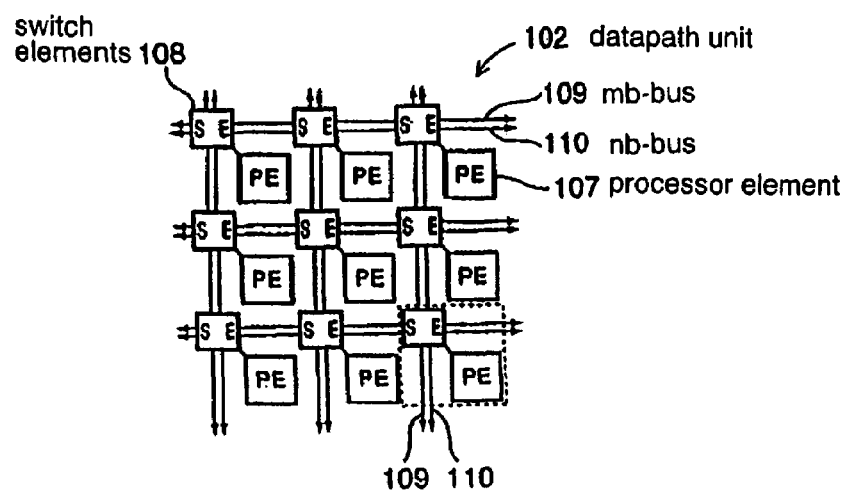
FIG. 2A and FIG. 2B are block diagrams of a circuit structure such as a m/nb bus of array-type computer processor.
Figure 2B:
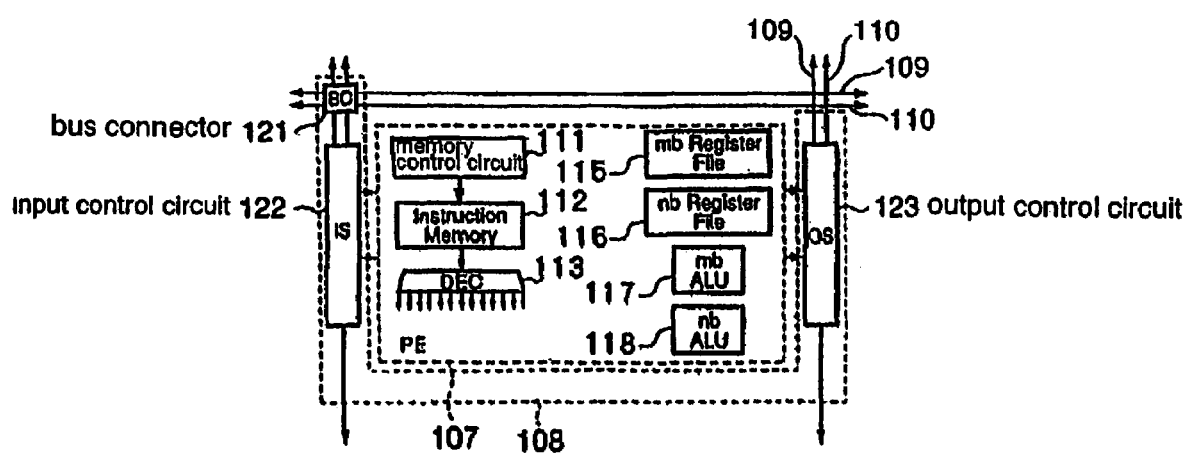
Figure 3:
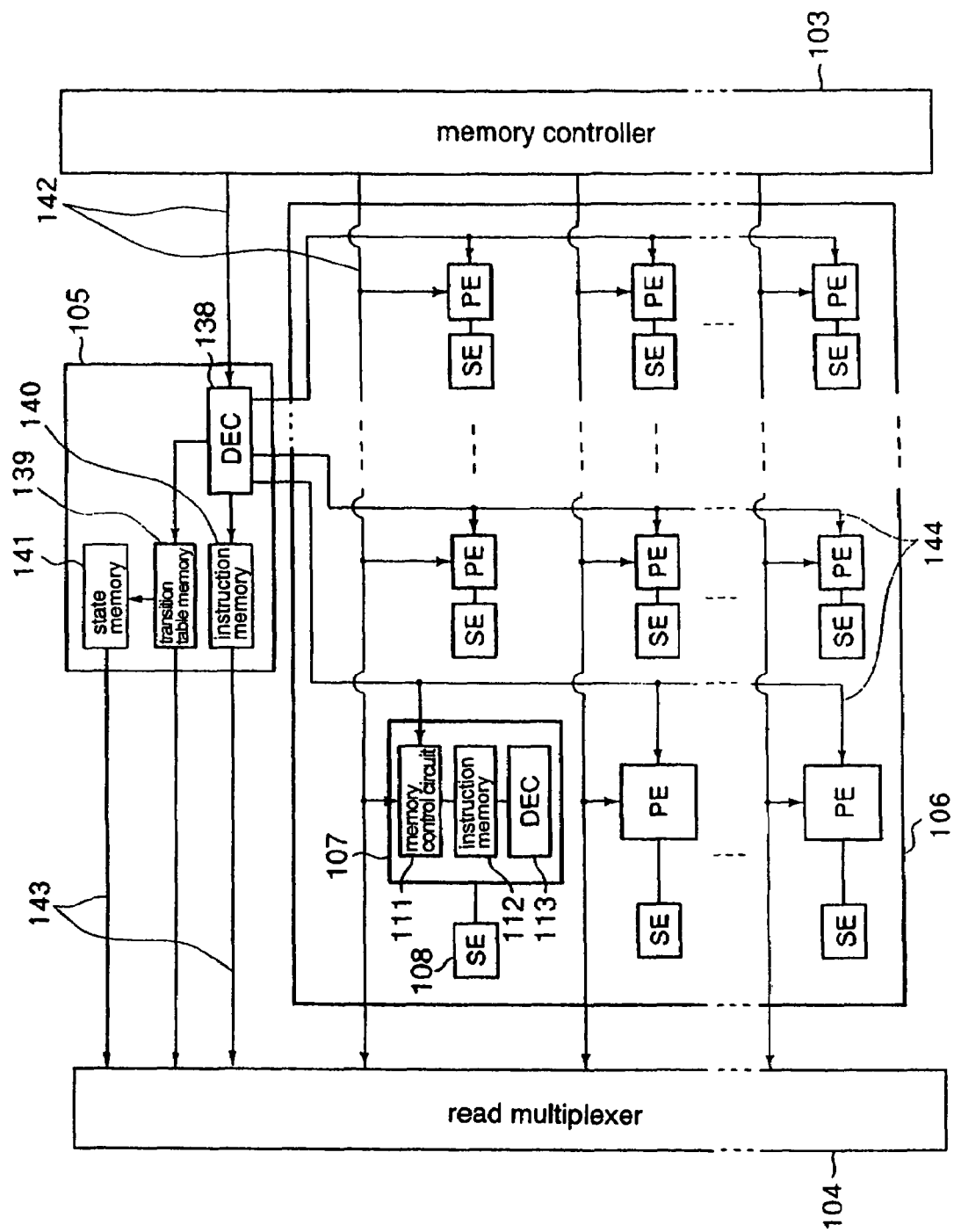
FIG. 3 is a block diagram of a circuit structure such as an instruction bus.

Data-path unit 106 includes, as shown in FIG. 2A, FIG. 2B and FIG. 3, a plurality of processor elements 107, a plurality of switch elements 108, a number of mb (m-bit) buses 109 forming a part of a data bus, a number of nb (n-bit) buses 110 forming a part of the data bus (sometimes referred to hereinafter as a m/nb data bus), and the like. A plurality of processor elements 107 and a plurality of switch elements 108 are arranged in a matrix, and are connected in a matrix via a number of m/nb buses 109, 110.

As shown in FIG. 2B, processor element 107 includes memory-control circuit 111, instruction memory 112 as a context-storage means, instruction decoder 113, mb register file 115, nb register file 116, mb ALU (Arithmetic and Logical Unit) 117, nb ALU 118, internal variable wiring (not shown), and the like. Switch element 108 includes bus connector 121, input-control circuit 122, output-control circuit 123, and the like.

As shown in FIG. 1, I/F unit 101 includes Protocol-control unit 131, task-switching circuit 150 (sometimes referred to hereinafter as "code obtaining circuit 150", particularly in regard to FIG. 4), memory-access unit 132, and synchronization-control circuit 133, which are connected in this order. Protocol-control unit 131 connects to external bus 300. Memory-access unit 132 connects to memory controller 103 and read multiplexer 104. Synchronization-control circuit 133 connects to state control unit 105 and data-path unit 106 in the processor core 102.

Protocol-control unit 131 has a data-set bus protocol in common with external bus 300. Protocol-control unit 131 communicates various data with external bus 300 according to the bus protocol and communicates various data with memory-access unit 132 via task-switching circuit 150 in a simple manner.

Memory-access unit 132 transmits, as shown in FIG. 1, various data that MPU 200 inputs to memory controller 103, data-path unit 106 and synchronization-control circuit 133 via external bus 300 to Protocol-control unit 131. Memory-access unit 132 also outputs various data transmitted from the above components to MPU 200 via Protocol unit 131 and external bus 300. Synchronization-control circuit 133 temporarily holds the event data that MPU 200 inputs via external bus 300 to Protocol-control unit 131, and temporarily holds the event data inputted to it by state control unit 105.

As shown in FIG. 1, MPU 200 inputs the event data to synchronization-control circuit 133 through other elements of the I/F unit 101. The synchronization control circuit 133 also temporarily holds the event data that is then obtained via data-path unit 106 by state control unit 105. State control unit 105 inputs event data to synchronization-control circuit 133 which temporarily holds the data that is then obtained by MPU 200.

Memory controller 103 transmits various data transmitted by Memory-access unit 132 in I/F unit 101 to state control unit 105 and data-path unit 106 in processor core 102. Read multiplexer 104 reads the data held in state control unit 105 and data-path unit 106 to transmit the data to Memory-access unit 132.

More particularly, as shown in FIG. 3, state control unit 105 includes instruction decoder 138, transition table memory 139, instruction memory 140 as a state-storage means, and state memory 141. Instruction decoder 138 connects to memory controller 103 via instruction bus 142. Instruction decoder 138 also connects to transition table memory 139 and instruction memory 140. Transition table memory 139 connects to state memory 141.

As mentioned above, read multiplexer 104 reads the data held in state control unit 105 and data-path unit 106. That is, each of memories 139 to 141 in state control unit 105 is connected to read multiplexer 104 via data bus 143. Processor/switch elements 107, 108 in data-path unit 106 connect to read multiplexer 104 via m/nb data bus 109, 110.

Figure 6:
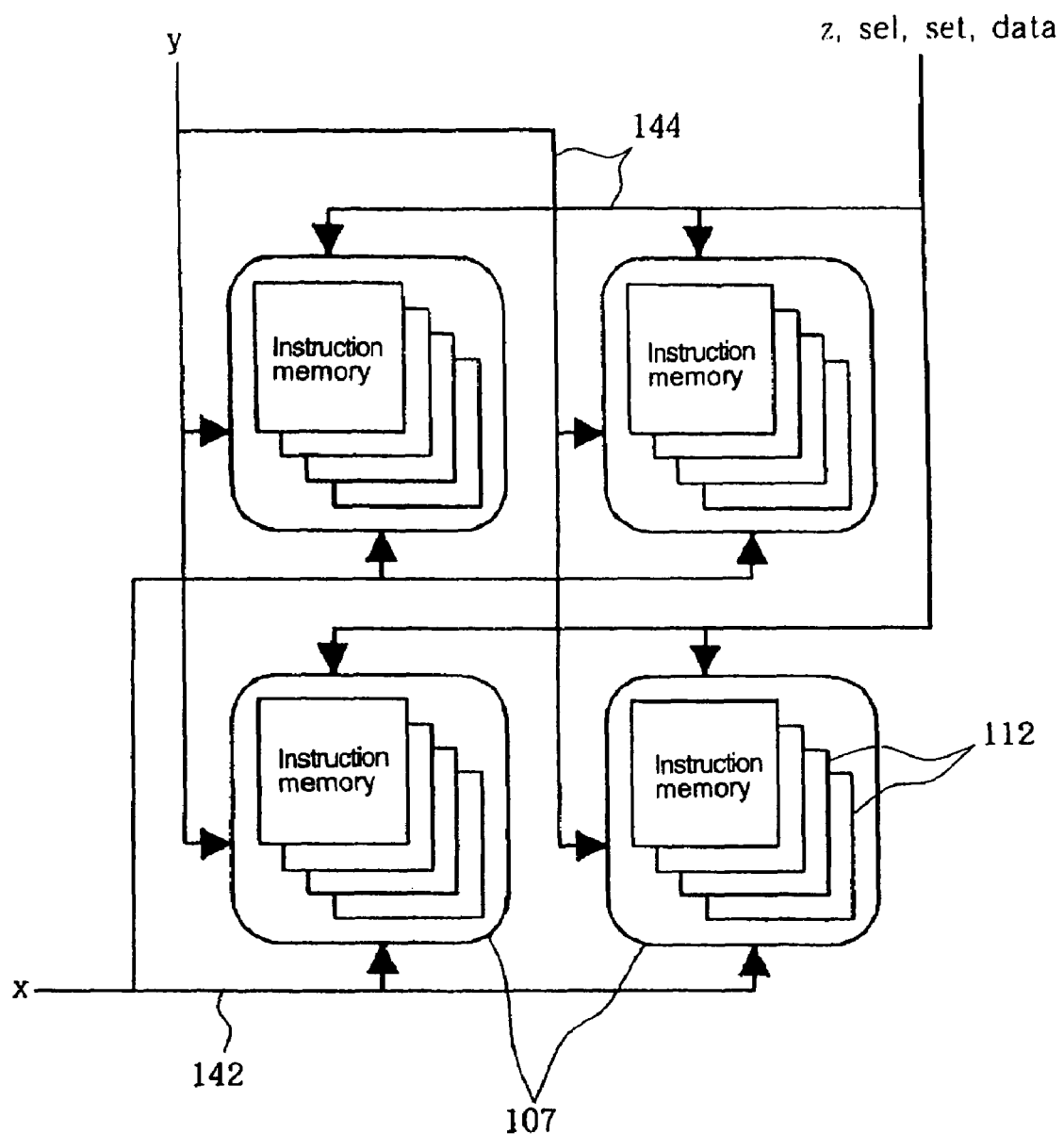
FIG. 6 is a schematic view of a substantial part of an array-type computer processor of a modified example.

Processor elements 107 are also, as shown in FIG. 3 and FIG. 6, arranged in a matrix with X rows and Y columns (X and Y are natural numbers of "2" or more). Instruction buses 142 in X rows are connected in parallel from memory controller 103 to read multiplexer 104. Instruction bus 142 for each row connects to memory-control circuit 111 in processor element 107 in Y columns. Further, address buses 144 in Y columns connect to one instruction decoder 138 in state control unit 105. Address bus 144 for each column connects to memory-control circuit 111 (FIG. 2B) in processor element 107 in X rows.

The computer program of array-type compute processor 100, constituted by data stored in program memory 302, is data described as a context in which the instruction codes for a plurality of processor elements 107 and a plurality of switch elements 108. The instruction codes of state control unit 105 for switching the context for each operation cycle are data which is described herein as sequentially-transferred operation states. The relative relationships between the plurality of operation states that are sequentially transferred are transition rules which are stored as described below.

In state control unit 105, therefore, instruction decoder 138 decodes the computer program that is read from program memory 302 by code-obtaining circuit 150, and data of the instruction code thus obtained is stored in instruction memory 140 (FIG. 3) while transition table memory 139 stores transition rules of a plurality of operation states, as is described in detail below.

State control unit 105 sequentially transfers the operation state according to the transition rules in transition table memory 139, and generates instruction pointers for the plurality of processor elements 107 and instruction pointers for the plurality of switch elements 108, according to the instruction code in instruction memory 140. The transition rules temporarily held in transition table memory 139 determine the current operation state, which is then temporarily held in state memory 141 (FIG. 3). Further, instruction memory 140 stores the plurality of instruction codes according to the plurality of operation states, so that memory controller 103 transmits the plurality of address data to state control unit 105 accordingly.

Instruction bus 142 transmits to state control unit 105 the instruction codes in which the address data of processor element 107 at which the instruction codes are stored are also encoded and data set. Instruction decoder 138 decodes the address data and transmits it to processor element 107 along one column selected from the Y columns of address buses 144.

At the same time, instruction memory 112 in processor element 107 stores data of an instruction code with memory controller 103 by selecting one of the X rows of instruction buses 142 for transmission of the instruction code. In this way, the instruction code and address data are transmitted to one processor element 107, and then the instruction code is stored in one address space of instruction memory 112 according to the address data.

As shown in FIG. 2B, switch element 108 shares instruction memory 112 of adjacent processor element 107, so that state control unit 105 supplies a pair of generated instruction pointers of processor element 107 and switch element 108 to instruction memory 112 in corresponding processor element 107.

Instruction memory 112 temporarily holds the instruction codes of processor element 107 and switch element 108, which codes are read from program memory 302, so that instruction codes for processor element 107 and switch element 108 are assigned in accordance with the instruction pointers supplied by state control unit 105. Instruction decoder 113 decodes the instruction codes which have been assigned using the instruction pointers, and controls the operations of switch element 108, internal variable wiring, m/nb ALU 117 and 118, and the like.

Mb bus 109 transmits mb of "8 (bit)" processed data, and nb bus 110 transmits nb of "1 (bit)" processed data, so that switch element 108 controls the connections between a plurality of processor elements 107 through m/nb buses 109, 110 according to the operation control by instruction decoder 113. More particularly, switch element 108 has bus connector 121 to which mb buses 109 and nb buses 110 communicate in four directions. Switch element 108 controls the connections between such a plurality of communicated mb buses 109 and the connections between the plurality of communicated nb buses 110.

In array-type computer processor 100, state control unit 105 thus sequentially switches the context of data-path unit 106 for each operation cycle according to a computer program that is data set in program memory 302. Thus, for each stage or step of the program, a plurality of processor elements 107 operate in parallel in data processes that can be set individually.

Input-control circuit 122, as shown in FIG. 2B, controls the connections of the data inputs from mb bus 109 to mb register file 115 and mb ALU 117, and the connections of the data inputs from nb bus 110 to nb register file 116 and nb ALU 118.

Output-control circuit 123 controls the connections of the data inputs from mb register file 115 and mb ALU 117 to mb bus 109, and the connections of the data inputs from nb register file 116 and nb ALU 118 to nb bus 110.

The internal variable wiring of processor element 107 controls the connections between mb register file 115 and mb ALU 117 and the connections between nb register file 116 and nb ALU 118 inside processor element 107, according to the operation control by instruction decoder 113.

Mb register file 115, according to the connection relation controlled by the internal variable wiring, temporarily holds the processed data of mb that is input from mb bus 109 and the like, and outputs the data to mb ALU 117 and the like. Nb register file 116, according to the connection relation controlled by the internal variable wiring, temporarily holds the processed data of nb that is input from nb bus 110 and the like, and outputs the data to nb ALU 118 and the like.

Mb ALU 117 performs (with mb processed data) the data process according to the operation control by instruction decoder 113. Nb ALU 118 performs (with nb processed data) the data process according to the operation control by instruction decoder 113. The m/nb data process can thus be appropriately performed according to the bit number of the processed data.

The process results from data-path unit 106 are fed back, if desired, to state control unit 105 as event data. State control unit 105, in accordance with the thus inputted event data, transfers the operation state to the next-stage operation state, and switches the context of data-path unit 106 to the next-stage context.

In principle, array-type computer processor 100 in this embodiment can read the instruction codes from program memory 302 and temporarily hold the instruction codes in state control unit 105 and data-path unit 106, respectively, to allow state control unit 105 and data-path unit 106 to operate according to the instruction code, as described above.

State control unit 105 and data-path unit 106 can, however, temporarily hold only a predetermined number of instruction codes at a time, so that state control unit 105 and data-path unit 106 may not temporarily hold all of a set of the instruction codes that are stored in program memory 302 as a computer program.

In this case, code-obtaining circuit 150 in I/F unit 101 obtains data of a predetermined number of cooperative partial instruction codes of the operation states along with the corresponding partial instruction codes of the contexts from program memory 202, so that state control unit 305 operates with temporarily holding only a predetermined number of the instruction codes of the operation states, and data-path unit 106 operates with temporarily holding only a predetermined number of the instruction codes of the contexts.

Every time state control unit 105 and data-path unit 106 complete their operations with the temporarily-held instruction codes, code-obtaining circuit 150 obtains the instruction codes of the subsequent operation states and contexts, so that array-type computer processor 100 can perform a set of operations even if the processor can only hold portions of the computer program.

More specifically, code-obtaining circuit 150 may include an ASIC (Application Specific Integrated Circuit), for example. Code-obtaining circuit 150 may also include, as shown in FIG. 4, hardware such as an event-input circuit 151 as an event-input means, a state-obtaining circuit 152 as a state-obtaining means, an operation-obtaining circuit 153 as an operation-obtaining means, a context-detection circuit 154 as a context-detection means, a context-obtaining circuit 156 as a context-obtaining means, a code-setting circuit 157 as a code-setting means, an event-output circuit 158 as an event-output means, a relation-generation circuit 159 as a relation-generation means, a relation-setting circuit 161 as a relation-setting means, a duplication-detection circuit 162 as a duplication-detection means, and an update-control circuit 163 as an update-control means.

If state control unit 105 detects the initial state temporarily holding no instruction codes, or the operation completion of a predetermined number of instruction codes temporarily held, state control unit 105 then outputs the event data for impossible continuation to event-input circuit 151 in code-obtaining circuit 150. Event-input circuit 151 in code-obtaining circuit 150 corresponds to, for example, an I/O (Input/Output) port and the like, and receives the event data for impossible continuation that is inputted from state control unit 105.

State-obtaining circuit 152, when event-input circuit 151 receives the event data for impossible continuation, then obtains data of the current operation state from state memory 141 in state control unit 105, and obtains from data-path unit 106 the event data assigning the next-stage operation state.

Operation-obtaining circuit 153, according to the operation states and event data that are obtained by state-obtaining circuit 152, obtains data of a predetermined number of the instruction codes of subsequent operation states from program memory 302 in accordance with a predetermined algorithm.

That is, the array-type computer processor 100 in this embodiment operates with state control unit 105 that transfers the operation states to the next-stage operation state, and transfers the contexts of data-path unit 106 to the next-stage contexts, as described above. In this case, data-path unit 106 performs the data process with the contexts, and then outputs to state control unit 105 the event data assigning the next-stage operation state to transfer to the next-stage contexts.

According to the input event data, state control unit 105 then transfers its own operation states to the next-stage condition, and transfers the contexts of data-path unit 106 to the next-stage contexts. Thus, when array-type computer processor 100 stops its operation and the current operation state of state control unit 105 and the event data for data-path unit 106 are obtained in response thereto, the next-stage operation state is provided.

Figure 5C:
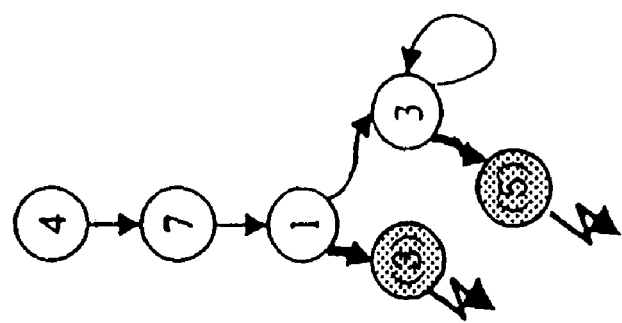
FIG. 5A and FIG. 5B and FIG. 5C are schematic views of a logical structure of a computer program.
Figure 5B:
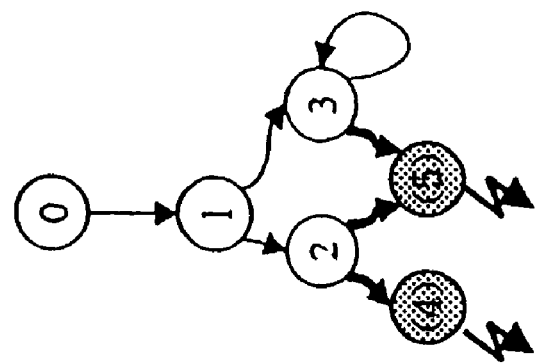
Figure 5A:
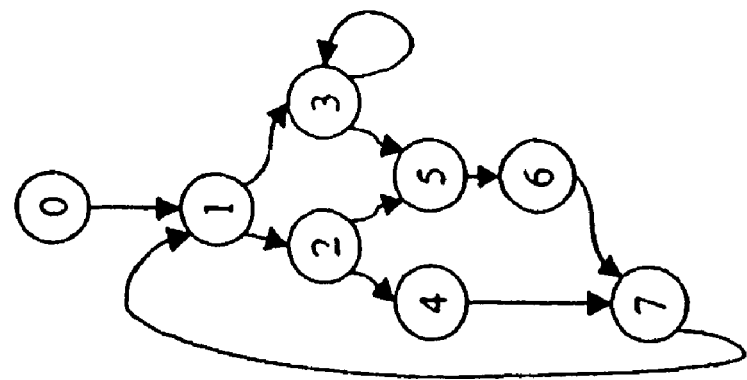

For example, as shown in FIG. 5A, suppose that the computer program of array-type computer processor 100 includes instruction codes of eight conditions and contexts of "0 to 7", and that instruction memories 141 and 112 of state control unit 105 and data-path unit 106 can only temporarily hold four instruction codes.

At the initial state shortly after the power supply of array-type computer processor 100 is turned on, state memory 141 of state control unit 105 holds data of no current operation states, of course, so that state-obtaining circuit 152 can detect that the operation states are not being held. The operation-obtaining circuit then automatically obtains data of a set of sour instruction codes beginning with "0" from program memory 302. In this case, as shown in FIG. 5A, the four instruction codes can be data obtained in a pattern of "0→1→(2, 3)", as well as in a pattern of "0→1→2→4", "0→1→2→5", and "0→1→3→5." The operation-obtaining circuit obtains data of the instruction codes in a proper pattern with a well-known algorithm such as breadth first search, for example.

Context detection circuit 154 (FIG. 4) detects data of a predetermined number of contexts corresponding to the operation states of the instruction codes that are obtained by operation-obtaining circuit 153. Context-obtaining circuit 156 obtains from program memory 302 the instruction codes of the contexts whose data are detected by context-detection circuit 154.

Code-setting circuit 157 sets the instruction codes of the operation states and contexts in state control unit 105 and data-path unit 106. After code-setting circuit 157 completes setting the instruction codes, Event-output circuit 158 outputs the event data for starting the operation to state control unit 105.

Relation-generation circuit 159 data generates the correspondence relations between the contexts whose data are detected by context-detection circuit 154 and the operation states. Relation-setting circuit 161 also sets data of the correspondence relations whose data are generated by relation-generation circuit 159 in state control unit 105. That is, instruction memory 112 in processor element 107 temporarily holds the instruction code for each of the plurality of contexts, and the instruction code and memory address can have any relationship between them.

Because state control unit 105 assigns the instruction code of the contexts with the memory address in instruction memory 112, relation-generation circuit 159 data generates the correspondence relations between the contexts and operation states, which is necessary for the assignment, and relation-setting circuit 161 sets data of the relations in state control unit 105.

Upon input of the event data for starting the operation, state control unit 105 starts to sequentially transfer the operation states according to the instruction code and transition rules whose data are stored, and sequentially transfers the contexts of data-path unit 106 for each of the operation states that are sequentially transferred according to the data-set correspondence relations.

Duplication-detection circuit 162 preferably detects duplication between the plurality of the last-time contexts and the plurality of this-time contexts whose data are detected by context-detection circuit 154. Update-control circuit 163 can then eliminate the duplicated data from being obtained from program memory 302 by context-obtaining circuit 156, and the setting of data of the instruction codes in data path unit 106 by code-setting circuit 157 for the duplicate contexts detected by duplication-detection circuit 162.

For example, the last-time four contexts of "0→1→(2, 3)", as shown in FIG. 5B, and the this-time four contexts of "4→7→1→3", as shown in FIG. 5C, have two contexts (e.g. 1 and 3) that duplicate. If duplication-detection circuit 162 detects such duplication of contexts, update-control circuit 163 operation controls context-obtaining circuit 156 and code-setting circuit 157 to prevent the duplicated data from being obtained and setting of data of the (duplicated) instruction codes.

Figure 4:
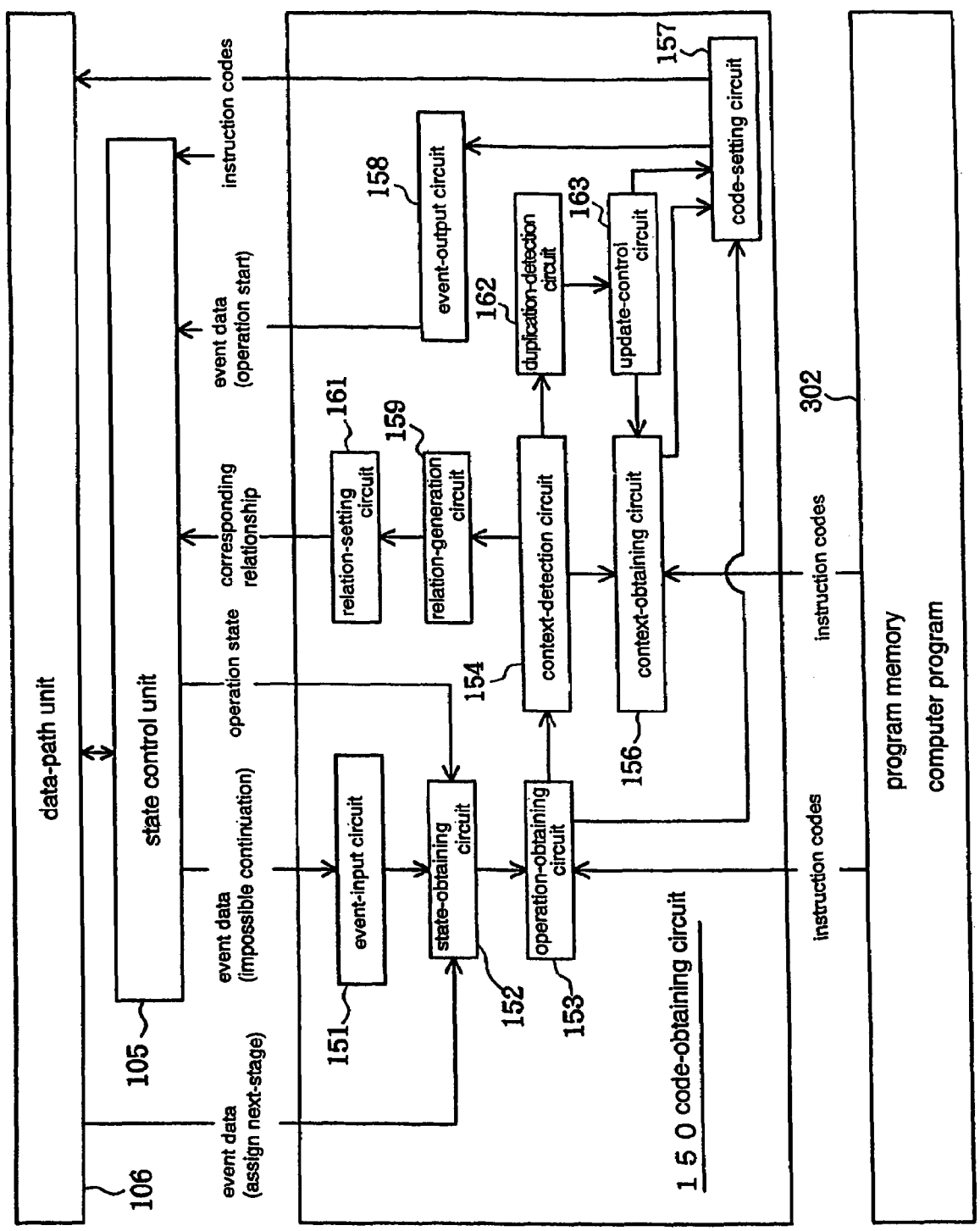
FIG. 4 is a block diagram of a circuit structure of a code-obtaining circuit which is a code-obtaining means.

For ease of illustration, FIG. 4 shows task-switching circuit 150 having state control unit 105, data-path unit 106, and program memory 302 that directly connect to task-switching circuit 150. As shown in FIG. 1, however, task-switching circuit 150 actually connects to state control unit 105 and data-path unit 106 via Memory-access unit 132, and also connects to program memory 302 via Protocol-control unit 131. Task-switching circuit 150 thus actually communicates with each part as described above via Memory-access unit 132 and Protocol-control unit 131 and the like.

Operations of an Embodiment

In the above-described configurations of data-processing system 1000 in this embodiment, MPU 200 acts as a main processor and array-type computer processor 100 acts as a coprocessor, so that array-type computer processor 100 data and MPU 200 can process data cooperatively.

Array-type computer processor 100 and MPU 200 can each read their own computer programs, each of the respective computer programs containing partial instruction codes corresponding to operation states and contexts, respectively, from program memories 302 and 303, and perform corresponding process operations to cooperatively perform data processes in the processor and co-processor using the processed data inputted via data line 301. Thus the partial instruction codes which comprise the respective computer programs of the processor and co-processor are referred to herein as cooperative partial instruction codes. After the data processes are performed, array-type computer processor 100 and MPU 200 output the processed data to data line 301.

The computer program of array-type computer processor 100 comprises data which is described as a context by or in accordance with which the instruction codes of a plurality of processor elements 107 and a plurality of switch elements 108 are sequentially controlled. The computer program of array-type computer processor 100 also comprises data described as an operation state in which the instruction code of state control unit 105 is sequentially transferred to switch the context for each operation cycle. In array-type computer processor 100 that operates according to such a computer program, state control unit 105 sequentially transfers the operation state, and sequentially transfers the context of data-path unit 106 for each operation cycle. Thus, for each operation cycle, a plurality of processor elements 107 operate in parallel in individually settable data processes and a plurality of switch elements 108 switchably control the connections between the plurality of processor elements 107.

In this case, the process results in data-path unit 106 are fed back, if required, to state control unit 105 as the event data. State control unit 105 thus transfers the operation state to the next-stage (e.g. of the program) operation state, and switches the context of data-path unit 106 to the next-stage (e.g. of the program) context in accordance with the event data.

As described above, array-type computer processor 100 in this embodiment can read the instruction code from program memory 302 and temporarily hold the instruction code in state control unit 105 and data-path unit 106 to allow state control unit 105 and data-path unit 106 to cooperatively operate according to the instruction code of the program.

However, state control unit 105 and data-path unit 106 can temporarily hold only a predetermined number of instruction codes at a time, so that state control unit 105 and data-path unit 106 may not hold all of a set of the instruction codes comprising a computer program stored in program memory 302. In such a case, code-obtaining circuit 150 in I/F unit 101 obtains data of a predetermined number of cooperative partial instruction codes of the operation states along with the corresponding partial instruction codes of the contexts from program memory 302, so that state control unit 105 operates with temporarily holding only a predetermined number of the instruction codes of the operation states and data-path unit 106 operates with temporarily holding only a predetermined number of the instruction codes of the contexts.

Every time state control unit 105 and data-path unit 106 complete their operations with the temporarily-held instruction codes, code-obtaining circuit 150 obtains data of the instruction codes of subsequent operation states and contexts, so that array-type computer processor 100 can perform a set of operations even if it can only hold portions of the computer program.

More particularly, at the startup of array-type computer processor 100 in this embodiment, various memories 139 to 141 in state control unit 105 hold no data, of course, so that state control unit 105 detects the initial state where the instruction codes are not temporarily held and outputs the event data for impossible continuation to code-obtaining circuit 150 in I/F circuit 101.

Then, in code-obtaining circuit 150, as shown in FIG. 4, event-input circuit 151 receives the input of the event data for impossible continuation, and in response to this (event) input, state-obtaining circuit 152 obtains data of the current operation state from state memory 141 in state control unit 105. At the initial state shortly after the array-type computer processor 100 starts up, state memory 141 in state control unit 105 holds data of no operation states as described above, so that state-obtaining circuit 152 can detect state control unit 105 as being at the initial state.

According to the detected initial state and the inputted event data, operation-obtaining circuit 153 then obtains data of a predetermined number of the instruction codes of subsequent operation states from program memory 302. In the case of the initial state, a predetermined number of instruction codes starting at the first operation state.

Context-detection circuit 154 then detects a similar predetermined number of contexts according to the operation states of the instruction codes. Context-obtaining circuit 156 obtains the instruction codes of the contexts from program memory 302.

For example, as shown in FIG. 5A, if the computer program of array-type computer processor 100 includes instruction codes of eight conditions and contexts of "0 to 7", and instruction memories 141 and 112 of state control unit 105 and data-path unit 106 can only temporarily hold four instruction codes, the four instruction codes can be obtained in a pattern such as "0→1→(2, 3)" for the initial state, as shown in FIG. 5B.

After the instruction codes of the operation states and contexts are data obtained as described above, code-setting circuit 157 sets data of the instruction codes in state control unit 105 and data-path unit 106. The relation-generation circuit generates the correspondence relations between the data-detected contexts (e.g. transition rules) and the operation states. Relation-setting circuit 161 then also sets data of the data-generated correspondence relations in state control unit 105.

Upon completion of setting data of the above-described instruction codes and correspondence relations, event-output circuit 158 outputs the event data for starting the operation to state control unit 105. State control unit 105 then starts to sequentially transfer the operation states according to the instruction codes and transition rules (whose data are stored), and sequentially transfers the contexts of data-path unit 106 for (e.g. corresponding to) each of the operation states that are sequentially transferred according to the data-set correspondence relations. When sequentially transferring the operation states as described above, state control unit 105 holds data of the current operation state in state memory 141.

If state control unit 105 and data-path unit 106 hold only a predetermined number of a great number of instruction codes of the computer program as described above, when array-type computer processor 100 operates as described above, a condition may occur where the operations according to the instruction codes cannot be continued. State control unit 105 again outputs the event data for impossible continuation to code-obtaining circuit 150. After receiving the input of the event data for impossible continuation, code-obtaining circuit 150 obtains data of the current operation state from state memory 141 in state control unit 105, and obtains from data-path unit 106 the event data assigning the next-stage operation state.

The event data of data-path unit 106 assigns the next-stage operation state of state control unit 105 as described above. Code-obtaining circuit 150 thus specifies the next-stage operation state from the event data and the current operation state of state control unit 105, and obtains data of a predetermined number of instruction codes starting at the next-stage operation state from program memory 302.

If, for example, among the eight instruction codes of "0 to 7" of a computer program, as shown in FIG. 5A, array-type computer processor 100 operates with four instruction codes of "0→1→(2, 3)", as shown in FIG. 5B, and stops at the time of moving from the instruction code "2" to the instruction code "4", the current operation state is "2", the event data assigns the movement to the operation state "4", so that code-obtaining circuit 150 obtains data of four instruction codes starting at "4".

Note, however, that code-obtaining circuit 150 detects, when obtaining data of the subsequent instruction codes as described above, the duplication between the plurality of the last-time contexts and the plurality of this-time contexts, and eliminates the obtaining of data from program memory 302 and the setting data of in data-path unit 106 of the instruction codes that is detected as being a duplicate of data already obtained and currently stored/set.

For example, for the last-time four contexts of "0→1→(2, 3)" as shown in FIG. 5B, and the this-time four contexts of "4→7→1→3" as shown in FIG. 5C, two contexts of "1, 3" duplicate. For such detection of duplication of contexts, the contexts of "4, 7" are the only data obtained at this time.

Code-obtaining circuit 150 obtains data of the instruction codes of the operation states and contexts as described above, and then sets data of the instruction codes in state control unit 105 and data-path unit 106. Note, however, that the setting data of the duplication-detected instruction codes is omitted, as described above, and the new instruction codes are overwritten at the positions of the last-time unnecessary instruction codes.

If, for example, the last-time four contexts of "0→1→(2, 3)" are updated to the this-time four contexts of "4→7→1→3", as shown in FIGS. 5B and 5C, the contexts of "0, 2" are overwritten with the contexts of "4, 7".

Code-obtaining circuit 150 also data generates the correspondence relations (e.g. transition rules) between the data-detected contexts and the operation states, and sets data of the correspondence relations in state control unit 105. After completing the setting data of the instruction codes and correspondence relations as described above, code-obtaining circuit 150 outputs the event data for starting the operation to state control unit 105.

State control unit 105 thus starts to sequentially transfer the operation states according to the instruction codes and transition rules that are stored, and sequentially transfer the contexts of data-path unit 106 corresponding to and cooperating with each of the operation states that are sequentially transferred according to the data-set correspondence relations. In array-type computer processor 100 in this embodiment, every time state control unit 105 and data-path unit 106 stop their operations with the instruction codes currently stored/set, code-obtaining circuit 150 continues its operations as described above.

Effects of the Embodiment

In array-type computer processor 100 in this embodiment, every time state control unit 105 and data-path unit 106 stop their operations with the data-set instruction codes, code-obtaining circuit 150 continues its operations as described above, so that even if state control unit 105 and data-path unit 106 can only data hold portions of a number of instruction codes of the computer program, a set of process operations corresponding to the computer program can be performed.

Furthermore, when code-obtaining circuit 150 only updates a predetermined number of the instruction codes of operation states and contexts, duplication is detected between the plurality of the last-time contexts and the plurality of this-time contexts, and the obtaining of data from program memory 302 and the setting data of in data-path unit 106 of the instruction codes of the contexts whose duplication is detected are eliminated. The instruction codes can thus be updated with less processing burden and required time, thereby providing lower power consumption and higher process speed of array-type computer processor 100.

Further, in array-type computer processor 100 in this embodiment, code-obtaining circuit 150 is built as hardware that performs the process operation for obtaining data of portions of a set of instructions comprising a program (wherein such portions comprise a number of instruction codes at a time) from program memory 302 and setting corresponding data in state control unit 105 and data-path unit 106 as described above, so that array-type computer processor 100, alone, can perform the above-described operations at high speed.

Modified Examples of the Embodiment

The present invention is not limited to the embodiments described above and various changes can be made without departing from the spirit and scope thereof. For example, the above-described embodiments illustrate data-processing system 1000 including array-type computer processor 100, MPU 200, and program memories 302 and 303, which are connected via external bus 300. Also possible, however, is a data-processing system (not shown) including only array-type computer processor 100 and program memory 302, and the like.

The above-described embodiments also illustrate code-obtaining circuit 150 that intervenes between protocol-control unit 131 and memory-access unit 132. This code-obtaining circuit 150 can, however, reside at various positions (e.g. in conjunction with various other elements of the system) where its functions can be realized. The above-described embodiments also illustrate code-obtaining circuit 150 that has hardware of various means provided as various circuits 151 to 163. However, the combination of the microprocessor and software, for example, can provide some or all of the circuits in code-obtaining circuit 150.

MPU 200 with software can also provide some or all of various circuits 151 to 163 in code-obtaining circuit 150. MPU 200 provides the function of code-obtaining circuit 150 at lower speed, but can provide the function of code-obtaining circuit 150 according to the computer program of MPU 200 that is stored in program memory 303, so that MPU 200 can easily provide the function without any change of the structure of array-type computer processor 100.

For example, MPU 200 can provide all functions of code-obtaining circuit 150 according to the computer program that is stored in program memory 303 as the computer program for allowing MPU 200 to perform operations such as receiving the event data for impossible continuation that is inputted by state control unit 105 in array-type computer processor 100 upon input of the event data for impossible continuation, obtaining data of the current operation state from state control unit 105 and obtaining from data-path unit 106 the event data for assigning the next-stage operation state; according to the operation states and event data that are obtained, obtaining data from program memory 302 comprising a predetermined number of the instruction codes of subsequent operation states by using a predetermined algorithm; detecting data of a predetermined number of contexts according to the operation states of the instruction codes; obtaining data from program memory 302 of the instruction codes of the data-detected contexts; setting data of the instruction codes of the operation states and contexts that are data obtained in state control unit 105 and data-path unit 106; detecting the duplication between the plurality of the last-time contexts and the plurality of this-time contexts; eliminating the obtaining of data and setting data of the instruction codes of the duplicate-detected contexts; generating the correspondence relations between the contexts and the operation states; setting data in state control unit 105 of the correspondence relations; and, upon completion of setting data of the instruction codes and correspondence relations, outputting the event data for starting the operation to state control unit 105.

A dedicated circuit such as an ASIC (not shown) that connects to array-type computer processor 100 via external bus 300 and the like can also provide some or all functions of various circuits 151 to 163 in code-obtaining circuit 150. Such a dedicated circuit can also be integrated with program memory 302 in array-type computer processor 100.

As illustrated in the above-described embodiments, code-obtaining circuit 150 data updates the instruction codes of state control unit 105 and data-path unit 106, by omitting the data obtainment and setting data of the instruction codes of the duplicate contexts between the last time and this time. All instruction codes can also be updated each time, however, without detecting duplication or omitting process operations.

This case does not provide less process burden or required time for the data update of the instruction code. This case, however, eliminates the detection of the duplicate instruction codes and the control of omitting operations, thereby making it possible to eliminate the duplication-detection circuit 162 and update-control circuit 163 to reduce the process burden and required time for their operation.

That is, if a number of duplications are expected to occur in the instruction codes, a predetermined number of which are updated at a time, the duplication-detection circuit 162 and update-control circuit 162 are preferably provided. If few duplications are expected to occur in the instruction codes, a predetermined number of which are updated at a time, it is preferable that no duplication-detection circuits 162 or update-control circuits 162 are provided.

As illustrated in the above-described embodiments, the context can be updated with less process burden and required time, by providing duplication-detection circuit 162 and update-control circuit 163 in code-obtaining circuit 150 to detect only the duplicate contexts between this time and the last time in order to omit the obtaining of data and setting data of the instruction codes which would result in duplication.

As perfecting features of the invention which are not necessary to the successful practice thereof in accordance with its basic principles, as discussed above, Code-obtaining circuit 150 can also include an update-storage means for registering the various update techniques of the contexts and their update cost, and a technique-detection means for detecting the update technique that minimizes the total of the update cost from the combination of the plurality of the last-time contexts and the plurality of this-time contexts, to allow the contexts of data-path unit 106 to be data updated with an update technique that is data detected by the code-setting circuit 157 by the operation control of the update-control circuit 163.

The above-described update-storage means can be provided, for example, by a memory circuit that stores data of the various update techniques as a computer program. The technique-detection means can be provided, for example, by a micro processor that reads a predetermined computer program from the memory circuit according to the stored computer program and performs the process operations.

The first update technique can be a technique in which, for example, the context-obtaining circuit 156 obtains data of only different instruction codes between the last-time and this-time contexts, and the code-setting circuit 157 sets data of only the difference between the this-time and the last-time instruction codes. If there are a plurality of different instruction codes between the last-time and this-time contexts, the above update technique can also select a combination that minimizes the total of the update cost of the difference.

The second update technique can be a technique in which, in the predetermined combination of the last-time and this-time contexts, the last-time context in data-path unit 106 is initialized, and then the code-setting circuit 157 sets data of the this-time context.

The third update technique can be a technique in which in the predetermined combination of the plurality of the last-time and this-time contexts, the corresponding last-time contexts are overwritten with other last-time contexts, and then the context-obtaining circuit 156 obtains data of only the instruction codes different from those of the this-time contexts, and the code-setting circuit 157 sets data of the different instruction codes.

More specifically, for the last-time four contexts of "0→1→(2, 3)" as shown in FIG. 5B, and the this-time four contexts of "4→7→1→3" as shown in FIG. 5C, the two duplicate contexts of "1, 3" are not data updated, and the contexts of "0, 2" are data updated to the contexts of "4, 7".

The context includes, however, the instruction codes of processor elements 107 of a matrix with X rows and Y columns, so that the context of "0" and the context of "4" may have, for example, common instruction codes in most processor elements 107. In this case, the first update technique can be used to obtain and store only the differences in instruction codes to update the context of "0" to the context of "4", thereby reducing its process burden and increasing the operation speed.

For example, if, as described above, the context of "0, 2" is data updated to the context of "4, 7" only by the difference of the respective instruction code, the total update cost can be compared between the "0→4, 2→7" and "0→7, 2→4" to select a lower update cost to further reduce the process burden and increase the operation speed.

For the context of "0" being data updated to the context of "4" as described above, the instruction codes of the context of "0" are set in all the processor elements 107 of a matrix with X rows and Y columns, but the instruction codes of the context of "4" may only be set in portions of the processor elements 107 of a matrix with X rows and Y columns.

In this case, however, the processor elements 107 that do not set the instruction codes of this-time context of "4" will hold the last-time instruction codes, which need to be initialized. The instruction codes are initialized by serially selecting and concurrently performing setting of one of processor elements 107 of a matrix with X rows and Y columns as in the case where the instruction codes are stored, so that the update cost is the same as in the case where the instruction codes are stored.

The instruction codes of all processor elements 107 of a matrix with X rows and Y columns can thus be formed to be concurrently initialized to use the second update technique described above to initialize the context of "0" and then newly store the context of "4", thereby reducing the update cost.

For the context of "0" in "0→1→(2, 3)" being data updated to the context of "4" in "4→7→1→3", most instruction codes are different between "0" and "4", and most instruction codes are common between "1" that is not updated and "4" that is updated, for example.

In such a case, the context of "1" in "0→1→(2, 3)" is overwritten on the contexts of "0" at a time, and then the context of "1" is updated to the context of "4" only by the difference instruction codes, thereby making it possible to reduce its process burden and increase the operation speed.

Existing array-type computer processor 100 does not have a function of concurrently overwriting the held contexts on other contexts as described above. The instruction codes are initialized, as in the case where the instruction codes are stored, by serially selecting and concurrently performing initialization of individual processor elements 107 of a matrix with X rows and Y columns, since the initialization of all processor elements 107 in data updating the contexts as described above may increase the update cost.

The above-described update technique thus needs to reduce the update cost using a function of initializing the instruction codes of processor elements 107 of a matrix with X rows and Y columns at a first time, and a function of overwriting the held contexts on other contexts at another time. A specific description is given below of the hardware structure for easily and quickly initializing and overwriting the contexts.

As shown in FIG. 6, instruction memories 112 in processor element 107 are provided in a multistage structure with Z layers (Z is a natural number of "2" or more), each layer of which holds data of the instruction codes of each context. The address data "z" of the Z layer is also set at the instruction code that is decoded by instruction decoder 138 in state control unit 105.

State control unit 105 is arranged to also generate a set signal "set" for disabling the address data that concurrently selects one of processor elements 107 of a matrix with X rows and Y columns and for concurrently selecting all processor elements 107 of a matrix with X rows and Y column, and to also generate a select signal "sel" for selecting one of the Z contexts that are temporarily held in data-path unit 106 as the instruction codes.

Figure 7:
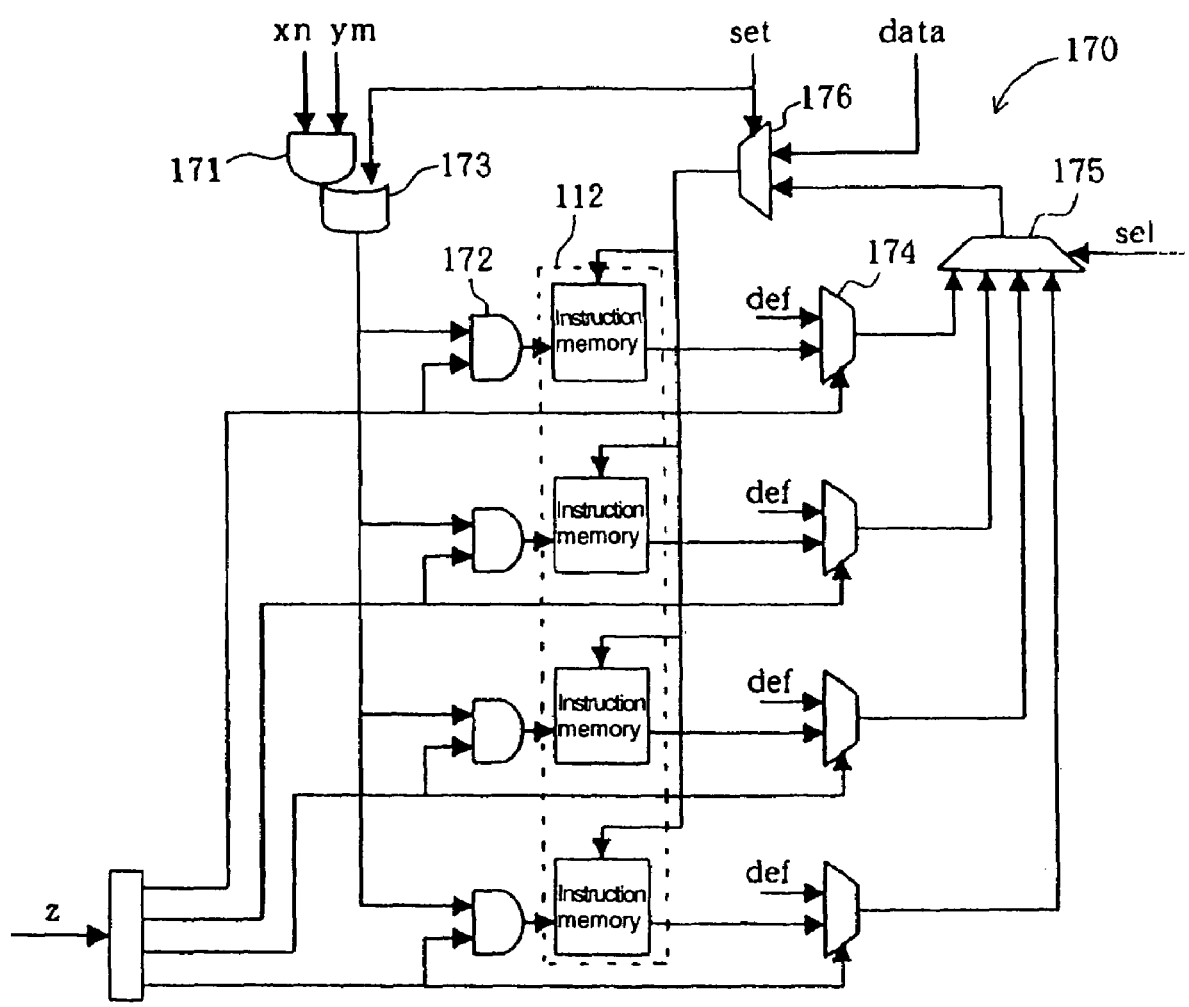
FIG. 7 is a block diagram of an internal circuit of a processor element.

As shown in FIG. 7, setting-all circuit 170 as the code-initializing means and code-overwriting means is provided in each processor element 107, and setting-all circuit 170 is connected to each layer of instruction memories 112.

Setting-all circuit 170 comprises logical circuits including circuits such as AND gates 171 and 172, OR gates 173, and selector circuits 174 to 176. Setting-all circuit 170 can data store the instruction code "data" for each externally-inputted context into one layer of instruction memories 112 as mentioned above, as well as initialize for each context the instruction codes that are temporarily held in instruction memory 112, and concurrently overwrite the instruction codes of any context on the instruction codes of any context that are temporarily held in instruction memory 112.

Specifically, AND gate 171 receives the address data "x, y" that concurrently selects one of processor elements 107 of a matrix with X rows and Y columns. Z AND gates 172 receive the output signal from AND gate 171 and the address data "z" of each layer of instruction memories 112.

The output signals from AND gates 172 are inputted to each layer of instruction memory 112. The address data "x, y" thus selects one of processor elements 107 of a matrix with X rows and Y columns, and the address data "z" selects one layer of Z layers of instruction memories 112 in processor element 107.

Note, however, that the output signal from AND gate 171, together with the above-described set signal "set", is input to OR gate 173, so that the set signal "set" generated will disable the address data "x, y" and select one layer of instruction memories 112 corresponding to the address data "z" in all processor elements 107.

Z selector circuits 174 each have one input terminal to which each layer of instruction memory 112 connects individually, and the other input terminal to which initial value "def" is inputted through ground and the like. Selector circuit 174 normally receives, externally, the above-described address data "z" as a control signal to output the instruction codes of one layer of instruction memories 112 connected to selector circuit 174. If, however, selector circuit 174 receives, externally, the address data "z" of one layer of instruction memories 112 connected to selector circuit 174, it data outputs the initial value "def".

The output signals from these Z selector circuits 174 are inputted to selector circuit 175. The select signal "sel" is also externally inputted to selector circuit 175. Selector circuit 175 selects one layer from Z layers of instruction memories 112 according to the externally-inputted select signal "sel". The output signal from selector circuit 175, together with the instruction code "data", is inputted to selector circuit 176. The above-described set signal "set" is also externally inputted to selector circuit 176. Selector circuit 176 selects, according to the set signal "set", the externally-inputted instruction code "data" or the instruction code that is data outputted from selector circuit 175, so that the selected instruction codes are stored in one layer of instruction memories 112 that is selected as described above.

For example, one of the plurality of contexts can be concurrently initialized in all the processor elements 107 as follows. With all processor elements 107 selected according to the set signal "set", one layer of instruction memories 112 is selected according to the address data "z". Selector circuit 174 then data outputs the initial value "def" according to the address data "z". If the above-described one layer of instruction memories 112 is selected according to the select signal "sel", selector circuit 175 then selects the initial value "def". Selector circuit 176 also selects this initial value "def" according to the set signal "set", and stores data of the initial value "def" in the selected one layer of instruction memories 112 as described above. The instruction codes of a particular context can thus be concurrently initialized in all the processor elements 107.

The last-time predetermined context can be overwritten on the other last-time contexts concurrently as follows. With all processor elements 107 selected according to the set signal "set", one layer of instruction memories 112 to be overwritten with a context is selected according to the address data "z". One layer of instruction memories 112 to be overwritten on a context is then selected according to the select signal "sel", so that selector circuit 176 also selects the instruction codes of the selected context according to the set signal "set". The selected instruction codes are data stored in the one layer of instruction memories 112 that is selected according to the address data "z". The last-time predetermined context is thus overwritten on the last-time other contexts at a time in all processor elements 107.

In the above-described setting-all circuit 170, if the set signal "set" selects selector circuit 175, the externally-inputted instruction code "data" is disabled. The instruction ode "data" can thus be used as a control signal for selector circuit 175 to eliminate the generation of the dedicated select signal "sel".

The above-described embodiments illustrate that it is possible for program memory 302 to store data of only one computer program of array-type computer processor 100, and array-type computer processor 100 obtains data of only one computer program from program memory 302 to perform only one process operation.

It is also possible, however, that program memory 302 stores data of a plurality of computer programs of array-type computer processor 100, and array-type computer processor 100 obtains data of the plurality of computer programs from program memory 302 in a time-sharing manner to perform a plurality of process operations in parallel in a time-sharing manner.

In this case, instruction memories 140 and 112 in state control unit 105 and data-path unit 106 temporarily hold the instruction codes of corresponding operation states and contexts of the plurality of computer programs. When state control unit 105 and data-path unit 106 are operating with one of the plurality of computer programs that is temporarily held, code-obtaining circuit 150 obtains data of a predetermined number of the cooperative partial instruction codes of the operation states of other computer programs, along with the corresponding partial instruction codes of the contexts.

For example, if a computer program "A" includes contexts and operation states of "a1 to a4", a computer program "B" includes contexts and operation states of "b1 to b4", and instruction memories 140 and 112 in state control unit 105 and data-path unit 106 each temporarily hold at a time four operation states and four contexts, instruction memories 140 and 112 first temporarily hold "a1 and a2" for the process operations of state control unit 105 and data-path unit 106.

In running of "a1 and a2", the free space of instruction memories 140 and 112 temporarily hold "b1 and b2". After running of "a1 and a2" is complete, running of "b1 and b2" starts. In running of "b1 and b2", "a1 and a2" in instruction memories 140 and 112 are updated to "a3 and a4". After running of "b1 and b2" is complete, running of "a3 and a4" starts.

In running of "a3 and a4", "b1 and b2" in instruction memory 140 and 112 are updated to "b3 and b4". After running of "a3 and a4" is complete, running of "b3 and b4" starts. In this way, array-type computer processor 100 can perform in a time-sharing manner the process operations in a plurality of computer programs, thereby performing the process operations of the plurality of computer programs at overall high efficiency.

More specifically, to achieve the parallel operations with a plurality of computer programs as described above, code-obtaining circuit 150 is provided with an operation stopping circuit as an operation-stopping means, a stop-obtaining circuit as a stop-obtaining means, a stop holding circuit as a stop holding means, and a switch-setting circuit as a switch-setting means (not shown).

The operation-stopping circuit stops the operations of state control unit 105 and data-path unit 106 upon input of the event data for program switching in event-input circuit 151. The stop-obtaining circuit obtains the operation state of stopped state control unit 105 and the processed data of stopped data-path unit 106.

The stop-holding circuit temporarily holds for each of the plurality of computer programs the data-obtained operation state and processed data. The switch-setting circuit data reads, upon completion of the temporary hold, from the stop-holding circuit the operation state and processed data of other computer programs, and then sets data of the operation state and processed data in state control unit 105 and data-path unit 106.

Event-output circuit 158 outputs event data to state control unit 105 event data for starting the operation upon completion of the setting of the event data. State control unit 105 starts to sequentially transfer the operation states upon input of the event data for starting the operation. The event data for program switching as described above can also serve as, for example, the event data for impossible continuation as described above.

The various circuits as described above can be provided in code-obtaining circuit 150 to allow array-type computer processor 100 to perform in parallel the process operations with a plurality of computer programs in a time-sharing manner. The combination of the micro processor and computer program (or MPU 200 and dedicated circuits) can provide, of course, some or all of the above-described various circuits.

Additionally, array-type computer processor 100 can also perform in parallel the process operations with a plurality of computer programs in a time-sharing manner as described above with priorities set among the plurality of computer programs. More specifically, in the above-described case, code-obtaining circuit 150 is provided with a priority-detection circuit as a priority-detection means and a code-increasing-and-decreasing circuit as a code-increasing-and-decreasing means (not shown).

The priority-detection circuit accumulates the frequency of use which becomes the computer program priority for each portion of the instruction codes of the plurality of that computer programs that is temporarily held in instruction memory 140 and instruction memory 112, to detect the priority among the plurality of computer programs of which only a portion of the instruction codes are temporarily held by instruction memory 140 and instruction memory 112 as described above.

The code-increasing-and-decreasing circuit preferentially deletes the instruction code with a lower frequency of use, for example, by increasing and decreasing the number of the instruction codes which are temporarily held in instruction memory 140 and instruction memory 112 among a plurality of computer programs in accordance with the priorities determined as discussed above.

If, for example, computer programs "A" and "B" are provided, and instruction memories 140 and 112 in state control unit 105 and data-path unit 106 each temporarily hold, at a given time, four operation states and four contexts, as described above, instruction memory 140 and 112 can each temporarily hold three contexts and three operation states of computer program "A" and temporarily hold one context and one operation state of "B", according to the priority. In this way, array-type computer processor 100 can run a plurality of computer programs in parallel at still higher efficiency.

While preferred embodiments of the present invention have been described using specific terms, such description is for illustrative purposes only, and it is to be understood that changes and variations may be made without departing from the spirit or scope of the following claims.

What is claimed is:

1. An array-type computer processor comprising:
   A) a data path unit, said data path unit including
      i) a plurality of processor elements arranged in a matrix, said processor elements performing data processes including generation and communication of event data, and
      ii) a plurality of switch elements, said plurality of switch elements controlling connections between said plurality of processor elements for respective operation states of said data path unit;
   B) a state control unit for receiving said event data from said processing elements and sequentially transferring
      i) a cooperative partial instruction code representing a context for each said operation state of said data path unit, and
      ii) an event data which has been input to said state control unit according to an instruction code
   to said data path unit for each said operation state according to an instruction code; and
   C) a code-obtaining means for
      i) obtaining data of a predetermined number of said instruction codes of a program from an external program memory, respective instruction codes of said instruction codes of said program comprising cooperative partial instruction codes wherein a cooperative partial instruction code of an instruction code represents an operation state and another cooperative partial instruction code of said instruction code represents a context corresponding to said connections between said plurality of processor elements, and
      ii) transferring said partial instruction codes representing operation states to said data path unit and transferring said partial instruction codes representing contexts to said data-path unit whereby
a) said state control unit temporarily holds only a predetermined number of partial instructions representing operation states for operation and
b) said data path unit temporarily holds only a predetermined number of said partial instruction codes representing contexts for operation,
said code-obtaining means being responsive to said data path unit and said state control unit such that every time said data path unit and said state control unit complete operations with cooperative partial instruction codes respectively held therein, said code-obtaining means obtains data of said respective cooperative partial instruction codes of said instruction codes of subsequent operation states and contexts, respectively.

2. A data processing system including a plurality of data-processing devices connected in parallel which perform various data process according to a computer program and event data,
at least one of a plurality of said data-processing devices including an array-type computer processor, said array-type computer processor comprising:
A) a data path unit, said data path unit including
  i) a plurality of processor elements arranged in a matrix, said processor elements performing data processes including generation and communication of event data, and
  ii) a plurality of switch elements, said plurality of switch elements controlling connections between said plurality of processor elements for respective operation states of said data path unit;
B) a state control unit for receiving said event data from said processing elements and sequentially transferring
  i) a cooperative partial instruction code representing a context for each said operation state of said data path unit, and
  ii) an event data which has been input to said state control unit according to an instruction code
to said data path unit for each said operation state according to an instruction code; and
C) a code-obtaining means for
  i) obtaining data of a predetermined number of said instruction codes of a program from an external program memory, respective instruction codes of said instruction codes of said program comprising cooperative partial instruction codes wherein a cooperative partial instruction code of an instruction code represents an operation state and another cooperative partial instruction code of said instruction code represents a context corresponding to said connections between said plurality of processor elements, and
  ii) transferring said partial instruction codes representing operation states to said data path unit and transferring said partial instruction codes representing contexts to said data-path unit whereby
    a) said state control unit temporarily holds only a predetermined number of partial instructions representing operation states for operation and
    b) said data path unit temporarily holds only a predetermined number of said partial instruction codes representing contexts for operation,
said code-obtaining means being responsive to said data path unit and said state control unit such that every time said data path unit and said state control unit complete operations with cooperative partial instruction codes respectively held therein, said code-obtaining means obtains data of said respective cooperative partial instruction codes of said instruction codes of subsequent operation states and contexts, respectively,
wherein at least one of a plurality of said data-processing devices includes said code obtaining means.

3. A data-processing system including an array-type computer processor and a program memory for scoring data of a computer program for said array-type computer processor, said array type computer processor comprising:
A) a data path unit, said data path unit including
  i) a plurality of processor elements arranged in a matrix, said processor elements performing data processes including generation and communication of event data, and
  ii) a plurality of switch elements, said plurality of switch elements controlling connections between said plurality of processor elements for respective operation states of said data path unit;
B) a state control unit for receiving said event data from said processing elements and sequentially transferring
  i) a cooperative partial instruction code representing a context for each said operation state of said data path unit, and
  ii) an event data which has been input to said state control unit according to an instruction code
to said data path unit for each said operation state according to an instruction code; and
C) a code-obtaining means for
  i) obtaining data of a predetermined number of said instruction codes of a program from an external program memory, respective instruction codes of said instruction codes of said program comprising cooperative partial instruction codes wherein a cooperative partial instruction code of an instruction code represents an operation state and another cooperative partial instruction code of said instruction code represents a context corresponding to said connections between said plurality of processor elements, and
  ii) transferring said partial instruction codes representing operation states to said data path unit and transferring said partial instruction codes representing contexts to said data-path unit whereby
    a) said state control unit temporarily holds only a predetermined number of partial instructions representing operation states for operation and
    b) said data path unit temporarily holds only a predetermined number of said partial instruction codes representing contexts for operation,
said code-obtaining means being responsive to said data path unit and said state control unit such that every time said data path unit and said state control unit complete operations with cooperative partial instruction codes respectively held therein, said code-obtaining means obtains data of said respective cooperative partial instruction codes of said instruction codes of subsequent operation states and contexts, respectively.

4. An array-type computer processor according to claim 1, wherein
said state control unit detects said operation completion or initial state, and outputs event data for impossible continuation to said code-obtaining means,
wherein said code-obtaining means comprises:
event-input means for receiving an input of said event data for impossible continuation;
state-obtaining means for obtaining current data of said operation state from said state control unit and obtaining said event data assigning said operation state at a next-stage from said data-path unit, upon input to said state-obtaining means of said event data for impossible continuation;

operation-obtaining means for obtaining data of a predetermined number of cooperative partial instruction codes of instruction codes of subsequent ones of said operation states, from said program memory, according to said operation state whose data are obtained and said inputted event data;

context-detection means for detecting data of a predetermined number of said contexts corresponding to the operation states of said data-obtained instruction codes;

context-obtaining means for obtaining data of the instruction codes of said data-detected contexts, from said program memory;

code-setting means for setting data in said state control unit and said data-path unit of said cooperative partial instruction codes of said operation states and said contexts whose data are obtained; and event-output means for outputting event data for starting the operation to said state control unit, upon completion of setting data of said instruction codes, and wherein said state control unit starts to sequentially transfer said operation states, upon input of said event data for starting the operation.

5. An array-type computer processor according to claim 4, wherein said code-obtaining means further comprises:
relation-generation means for data generating correspondence relations between said contexts, which are data detected by said context-detection circuit, and said operation states; and
relation-setting means for also setting data of said data-generated correspondence relations in said state control unit, and wherein
said state control unit sequentially transfers said contexts of said data-path unit for each of said operation states which are sequentially transferred according to said data-set correspondence relations.

6. An array-type computer processor according to claim 5, wherein said code-obtaining means further comprises:
duplication-detection means for detecting duplication between a plurality of last-time contexts and a plurality of this-time contexts; and
update-control means for eliminating obtaining and setting data of the instruction codes of said contexts whose duplication is detected in said data-path unit, from said program memory.

7. An array-type computer processor according to claim 5, wherein said code-obtaining means further comprises:
update-storage means for data registering one or more of various update techniques of said contexts and their update cost;
technique-detection means for detecting data of an update technique which minimizes a total of said update cost from a combination of a plurality of last-time contexts and a plurality of this-time contexts; and
update-control means for allowing the contexts of data-path unit to be data updated with an update technique that is data detected.

8. An array-type computer processor according to claim 7, wherein said update-control means includes said update technique, which is data registered in said update-storage means and data detected by said technique-detection means, in which said context-obtaining means obtains data of only different instruction codes between said last-time and this-time contexts, and said code-setting means sets data of only a difference between said this-time and last-time instruction codes.

9. An array-type computer processor according to claim 8, wherein if there are a plurality of different instruction codes between said last-time and this-time contexts, said update control means selects a combination which minimizes a total of said update cost of said difference.

10. An array-type computer processor according to claim 7, wherein said data-path unit comprises:
context-storage means for temporarily holding for a predetermined number of said contexts corresponding to said instruction codes; and code-initializing means for initializing said contexts comprising said temporarily-held partial instruction codes, wherein
said update-control means includes an update technique of said one or more update techniques in which data are registered in said update-storage means and in which data are detected by said technique-detection means, in which, in a predetermined combination of said last-time and this-time contexts, said code-initializing means initializes said last-time context, and then said code-setting means sets data of said this-time context.

11. An array-type computer processor according to claim 7, wherein said data-path unit comprises:
context-storage means for temporarily holding said instruction codes for a predetermined number of said contexts; and
code-overwriting means for overwriting, on instruction codes of any of said contexts, instruction codes of any of said contexts which are temporarily held in said context-storage means, wherein
said update-control means includes said update technique, which is data registered in said update-storage means and data detected by said technique-detection means, in which, in a predetermined combination of a plurality of said last-time and this-time contexts, said code-overwriting means overwrites corresponding said last-time contexts with other said last-time contexts, and then said context-obtaining means obtains data of only said instruction codes different from those of said this-time context, and said code-setting means sets data of said different instruction codes.

12. An array-type computer processor according to claim 4, wherein said program memory stores a plurality of said computer programs,
said state control unit includes condition-storage means for temporarily holding for each of a plurality of said operation states corresponding to said instruction codes,
said data-path unit includes context-storage means for temporarily holding for each of a plurality of said contexts corresponding to said instruction codes,
wherein said condition-storage means and said context-storage means temporarily hold said instruction codes of corresponding said operation states and said contexts of a plurality of said computer programs, and
when said state control unit and said data-path unit are operating with one of a plurality of said temporarily-held computer programs, said code-obtaining means obtains data of a predetermined number of cooperative partial instruction codes of said operation states of other said computer programs, along with corresponding partial instruction codes of said contexts.

13. An array-type computer processor according to claim 12, further comprising:
   operation-stopping means for stopping operations of state control unit and data-path unit upon input of event data for program switching in said event-input means;
   stop-obtaining means for obtaining said operation state of said stopped state control unit and said processed data of said stopped data-path unit;
   stop-holding means for temporarily holding for each of a plurality of said computer programs said data-obtained operation state and processed data; and
   switch-setting means for, upon completion of said temporary hold, data reading from said stop-holding means said operation state and said processed data of other said computer programs, and setting data of said operation state and processed data in said state control unit and said data-path unit, wherein
   said event-output means outputs, upon completion of said setting of data of, to said state control unit event data for starting the operation, and
   said state control unit starts, upon input of said event data for starting the operation, to sequentially transfer said operation states.

14. An array-type computer processor according to claim 12, further comprising:
   priority-detection means for detecting priorities of a plurality of said computer programs of which only portions of said instruction codes are temporarily held by said condition-storage means and said context-storage means; and
   code-increasing-and-decreasing means for increasing and decreasing among a plurality of said computer programs according to said priorities a number of said instruction codes of which only portions are temporarily held by said condition-storage means and said context-storage means.

15. An array-type computer processor according to claim 14, wherein
   said priority-detection means accumulates a frequency of use as said priority for each of portions of said instruction codes of a plurality of said computer programs which are temporarily held by said condition-storage means and said context-storage means, and
   said code-increasing-and-decreasing means preferentially deletes said instruction codes with lower said frequency of use.

16. A data-processing system including a data-processing device and a program memory which are connected to each other, wherein
   said data-processing device comprises an array-type computer processor according to claim 1, and
   said program memory stores data of said computer programs of the array-type computer processor.

17. A data-processing system according to claim 2, further comprising:
   a further data processing device other than a processing device of said array type processor, said further data processing device providing code-obtaining means for obtaining data of a predetermined number of cooperative partial instruction codes of said operation states along with corresponding partial instruction codes of said contexts, from said program memory.

18. A code-obtaining circuit in the data-processing system according to claim 3,
   said code-obtaining circuit obtaining data of a predetermined number of cooperative partial instruction codes of said operation states along with corresponding partial instruction codes of said contexts, from said program memory.

19. A code-obtaining circuit according to claim 18 integrated with said program memory.

* * * * *